(12) United States Patent
Katsumata et al.

(10) Patent No.: US 6,755,887 B2
(45) Date of Patent: Jun. 29, 2004

(54) METHOD OF SEPARATING METAL AND INORGANIC PARTICLES FROM METAL-INORGANIC PARTICLE COMPOSITE MATERIAL

(75) Inventors: Makoto Katsumata, Shizuoka (JP); Eiji Murofushi, Shizuoka (JP); Tatsuya Kato, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/062,411

(22) Filed: Feb. 5, 2002

(65) Prior Publication Data

US 2002/0112568 A1 Aug. 22, 2002

(30) Foreign Application Priority Data

Feb. 6, 2001 (JP) .................................... P2001-029755

(51) Int. Cl.$^7$ ................................................ C22B 7/00
(52) U.S. Cl. ...................................................... 75/402
(58) Field of Search ............................ 75/402, 403, 414

(56) References Cited

U.S. PATENT DOCUMENTS

| | | | |
|---|---|---|---|
| 3,661,737 A | 5/1972 | Scherer | |
| 5,080,715 A | * 1/1992 | Provencher et al. | .......... 75/708 |
| 6,053,959 A | 4/2000 | Ireland | |
| 6,089,479 A | 7/2000 | Chang et al. | |
| 6,129,134 A | 10/2000 | Divecha | |

FOREIGN PATENT DOCUMENTS

| | | |
|---|---|---|
| CA | 2085056 | 6/1994 |
| JP | 2001-59120 | * 3/2001 |

OTHER PUBLICATIONS

Patent Abstracts of Japan, 2001059120, vol. 2000, No. 20.

* cited by examiner

*Primary Examiner*—Melvyn Andrews
(74) *Attorney, Agent, or Firm*—Sughrue Mion, PLLC

(57) ABSTRACT

A metal-inorganic particle composite material is heated into a melt. Flux is thrown into the melt, and both the melt and the flux are brought into contact with each other sufficiently. The resulting melt is then left at rest so as to be separated into an upper layer containing inorganic particles a and a lower layer composed of metal. Subsequently the upper layer and the lower layer are recovered individually.

3 Claims, 1 Drawing Sheet

METHOD OF SEPARATING METAL AND INORGANIC PARTICLES FROM METAL-INORGANIC PARTICLE COMPOSITE MATERIAL

BACKGROUND OF THE INVENTION

1. Field of Invention

The present invention relates to a method for separating metal and inorganic particles from a metal-inorganic particle composite material generated because of dispersion of inorganic particles in base metal.

2. Related Art

Metal-inorganic particle composite materials generated by dispersing inorganic particles in base metal have been used widely for various kinds of members for the purpose of reduction in material weight, improvement in mechanical strength, and provision of functionality. However, waste disposal of such metal-inorganic particle composite materials have come into a problem. In the related art, there have been adopted measures such that the metal-inorganic particle composite materials are simply ground and mixed into other materials as they are, and stored or disposed of by landfills.

Further, with growing movement of environmental preservation or recycling of resources, there have been attempts to separate wastes of metal-inorganic particle composite materials into respective components and recover the components. However, in the present circumstances, no effective method is, in fact, established. For example, unexamined Japanese Patent Hei. 7-41874 discloses the following method. That is, a molten slag containing metal and inorganic particles is dry-ground into fine particles having a moderate particle size. The fine slag powder is subjected to low magnetic force selection under magnetic flux density not higher than 1,000 gauss. Thus, iron-component particles in the slag powder is selectively recovered by magnetic attraction. On the other hand, the residual slag powder after the low magnetic force selection is subjected to high magnetic force selection under magnetic flux density ranging from 1,000 gauss to 13,000 gauss. Further, aluminum-component particles or copper-component particles remaining after the high magnetic force selection are recovered individually by separation based on specific gravity.

In the method, however, it is necessary to form slag into fine powder. In addition, it is necessary to prepare a plurality of stages of magnetic force selection different in magnetic flux density, and a step of separation based on specific gravity. Thus, the process includes many steps and is complicated. Besides, the method is applicable only to metal-inorganic composite materials containing magnetic materials. Therefore, the application of the method is limited to some extent.

Oxides or nonferrous metal mediators generated at the time of manufacturing are generally mixed into metal-inorganic composite materials. However, in any method including the method described above, it is difficult to eliminate such components and separate metal therefrom. Accordingly, the purity of metal recovered is generally so low that an additional refining work may be required to use the metal as a fresh metal raw material.

SUMMARY OF THE INVENTION

The invention was developed in consideration of such complications. An object of the invention is to provide a method for separating metal and inorganic particles from a metal-inorganic particle composite material, by which high-purity metal can be recovered efficiently with a simple and easy operation regardless of the composition of the metal-inorganic particle composite material, particularly regardless of the kind of metal.

In order to attain the object, the invention provides a method for separating metal and inorganic particles from a metal-inorganic particle composite material generated because of dispersion of inorganic particles in base metal, the method including the steps of heating the metal-inorganic particle composite material into a melt; throwing flux into the melt and bringing the flux into contact with the melt sufficiently; subsequently leaving the melt at rest to thereby separate the melt into an upper layer containing the inorganic particles and a lower layer composed of the metal; and subsequently recovering the upper layer and the lower layer individually.

DETAILED DESCRIPTION OF PREFERRED EMBODIMENTS

An embodiment of the invention will be described below in detail with reference to the drawings.

Figure 1A:
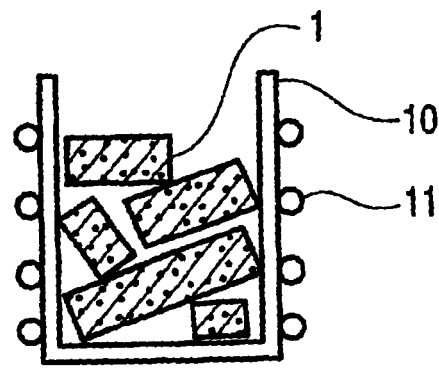
FIGS. 1A to 1D are views of steps for explaining a separation method according to the invention.

FIGS. 1A to 1D are schematic views respectively showing steps A to D for explaining a separation method according to the invention. First, as shown in FIG. 1A, a metal-inorganic particle composite material 1 to be treated is crushed into suitable lumps, and thrown into a heating vessel 10 having a suitable heating unit 11 such as a high frequency coil.

Figure 1B:
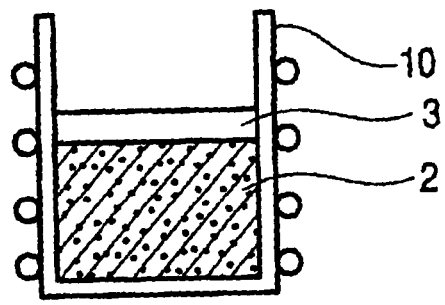

Next, as shown in FIG. 1B, the heating vessel 10 is heated to form the metal-inorganic particle composite material 1 into a melt 2. Flux 3 is placed on the liquid level of the melt 2. The flux 3 is, for example, a mixture of NaCl, KCl, $Na_3AlF_6$, etc. The components of the metal-inorganic particle composite material 1 are analyzed in advance, and the flux 3 is selected suitably in accordance with oxides or nonferrous metal mediators contained in the metal-inorganic particle composite material 1. In addition, it is preferable that the loading of the flux 3 is set to be in a range of from 0.2 parts to 2.0 parts by weight per 100 parts by weight of the metal-inorganic particle composite material.

Figure 1C:
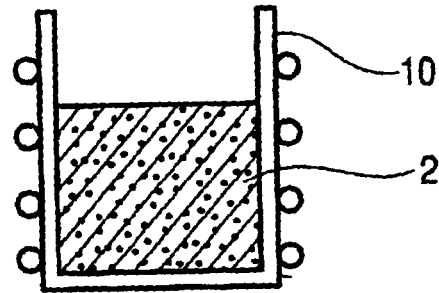

Next, as shown in FIG. 1C, the flux 3 is softly pressed into the melt 2, and mixed by stirring the melt 2 and flux 3 as a whole. Thus, the flux 3 is brought into contact with metal oxides, hydrogen, nonferrous metal mediators, and the like, contained in the metal-inorganic particle composite material 1 so that coagula of those components are produced in the melt 2. Therefore, in order to increase the purity of recovered metal, it is important to bring the melt 2 and the flux 3 into contact with each other sufficiently to thereby produce coagula as much as possible. The coagula are smaller in specific gravity than metal. Accordingly, by stirring, the coagula float in the melt 2 together with inorganic particles.

Figure 1D:
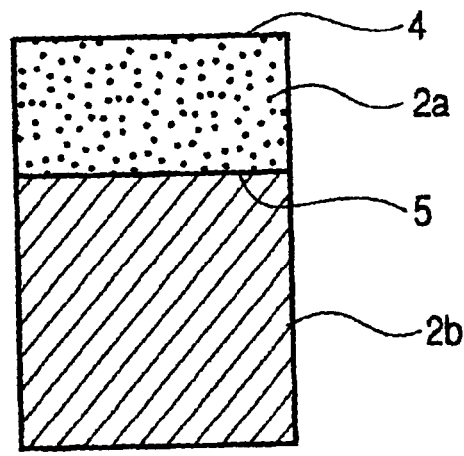

After being stirred, the melt 2 is left at rest while being heated. Thus, the coagula, the inorganic particles and the flux 3 come to the surface in the form of dross 4. After the dross 4 floats up to the surface sufficiently, heating is stopped, and the melt 2 is kept at rest. As a result, as shown in FIG. 1D, the melt 2 as a whole is solidified so that a solid separated into an upper layer composed of the dross 4 containing the inorganic particles 2a and a lower layer composed of metal 2b can be obtained.

Then, the solid is extracted from the heating vessel 10, and cut in a border 5 between the upper layer and the lower layer. Thus, the solid can be separated into the metal 2b and the inorganic particles 2a in the dross 4. At this time, respective components of the dross 4 are residual in the vicinity of the cut surface of the lower layer. It is therefore preferable that a predetermined thickness of the cut surface is eliminated to increase the purity of the metal 2b recovered.

Incidentally, the inorganic particles 2a are recovered from the dross 4 in accordance with the kind of the flux 3 used in the step shown in FIG. 1B. For example, when water-soluble flux 3 is used, the inorganic particles 2a can be recovered by dissolving the flux 3 in water or a suitable solvent. When high-temperature evaporative flux 3 is used, the inorganic particles 2a can be recovered by baking the whole of the dross 4.

Alternatively, according to the invention, the dross 4 may be separated from the metal 2b in the following manner. That is, in the step shown in FIG. 1D, the flux 3 is added, and the melt 2 is stirred and left at rest to make the dross 4 come to the surface. Then, while being heated, the dross 4 in the upper layer is skimmed with a net-like member. According to this method, it can be confirmed that the separation between the dross 4 and the metal 2b is completed when there is nothing to come to the surface, that is, when the dross 4 disappears. Then, the metal 2b, which is in a melt state, is poured into a mold as it is, cooled and recovered as an ingot. On the other hand, the inorganic particles 2a is recovered in the same manner as above.

The respective steps described above can be carried out by very easy operations of heating, stirring, leaving at rest, and cutting (or skimming). In addition, a series of steps can be carried out in the same heating vessel 10, and can be carried out in the atmosphere because the flux 3 is used. Therefore, the method according to the invention is superior also in workability. In addition, metal and inorganic particles can be separated from each other regardless of the composition of the metal-inorganic particle composite material, particularly regardless of the kind of the metal.

As has been described above, according to the invention, it is possible to separate and recover metal and inorganic particles efficiently with a simple and easy operation regardless of the composition of a metal-inorganic particle composite material, particularly regardless of the kind of the metal. In addition, it is possible to recover the metal with high purity.

What is claimed is:

1. A method for separating metal and inorganic particles from a metal-inorganic particle composite material generated because of dispersion of inorganic particles in a base metal; comprising the steps of:

heating said metal-inorganic particle composite material into a melt;

throwing flux into said melt and bringing said flux into contact with said melt sufficiently;

leaving said melt at rest to separate said melt into an upper layer containing said inorganic particles and a lower layer composed of said metal; and recovering said upper layer and said lower layer individually.

2. A method for separating metal and inorganic particles from a metal-inorganic particle composite material according to claim 1, wherein said flux is in a range of from 0.2 parts to 2.0 parts by weight per 100 parts by weight of said metal-inorganic particle composite material.

3. The method for separating metal and inorganic particles from a metal-inorganic particle composite material according to claim 1, wherein said upper layer is recovered by baking said flux.

* * * * *